June 2, 1942. H. J. MARLOWE Re. 22,105

EXERCISING MACHINE

Original Filed Dec. 6, 1935 4 Sheets-Sheet 1

INVENTOR
Harold J. Marlowe
BY
Dean, Fairbank, Hirsch & Foster
ATTORNEYS

June 2, 1942. H. J. MARLOWE Re. 22,105

EXERCISING MACHINE

Original Filed Dec. 6, 1935 4 Sheets-Sheet 2

INVENTOR
Harold J. Marlowe
BY
Dean, Fairbank, Hirsch & Foster
ATTORNEYS

June 2, 1942. H. J. MARLOWE Re. 22,105

EXERCISING MACHINE

Original Filed Dec. 6, 1935 4 Sheets-Sheet 3

INVENTOR
Harold J. Marlowe
BY
Dean, Fairbank, Hirsch & Foster
ATTORNEYS

June 2, 1942.
H. J. MARLOWE
EXERCISING MACHINE
Original Filed Dec. 6, 1935
Re. 22,105
4 Sheets-Sheet 4
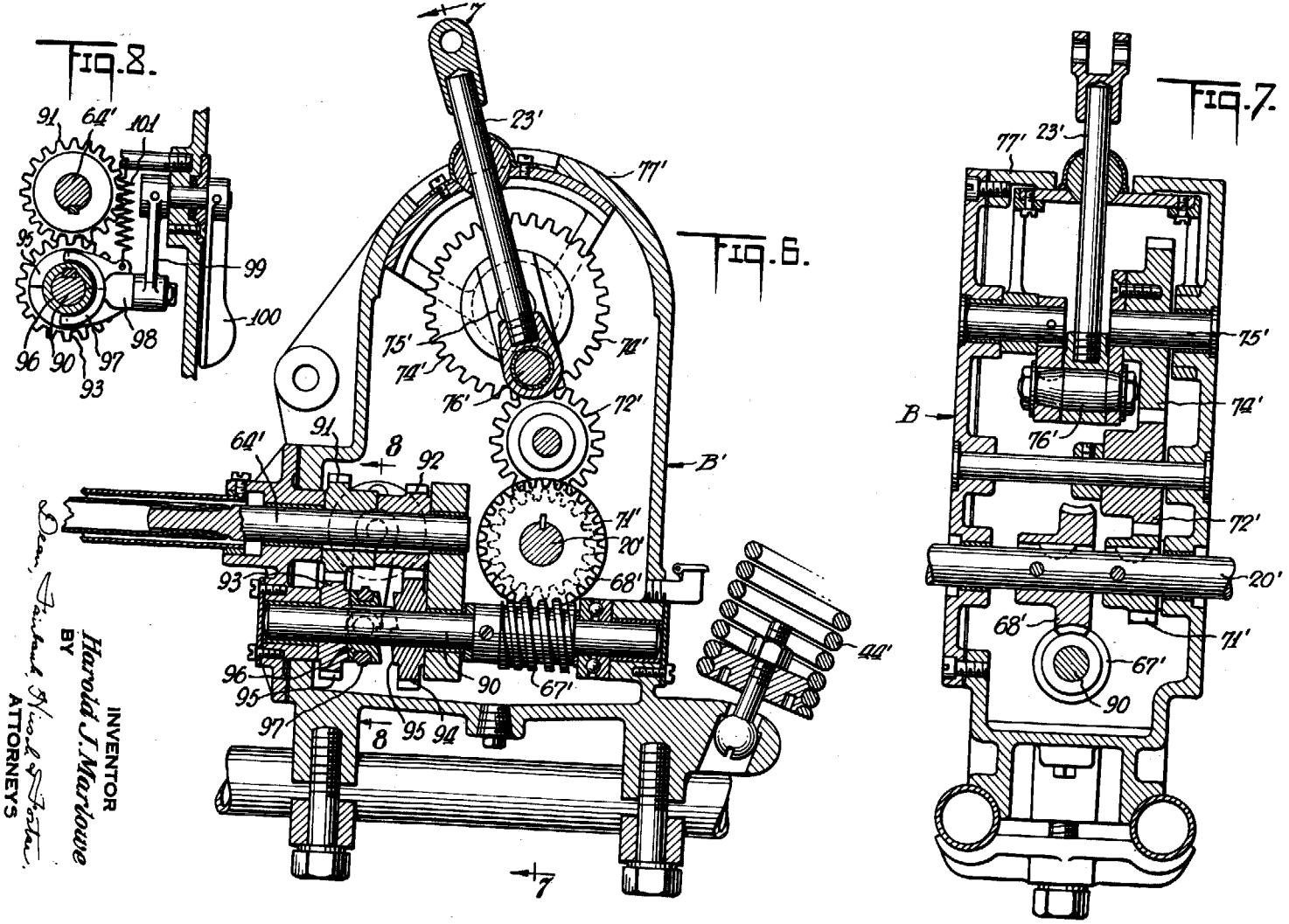
INVENTOR
Harold J. Marlowe
BY
Dean, Fairbank, Hirsch & Foster,
ATTORNEYS Reissued June 2, 1942

Re. 22,105

UNITED STATES PATENT OFFICE 22,105

EXERCISING MACHINE

Harold J. Marlowe, New York, N. Y., assignor to Exercycle Corporation, a corporation of Delaware Original No. 2,107,449, dated February 8, 1938, Serial No. 53,124, December 6, 1935. Application for reissue March 26, 1942, Serial No. 436,382

34 Claims. (Cl. 128—33)

My present invention is concerned with exercising machines and has among its objects to provide a simple and rugged apparatus, which serves effectively to exercise those muscles commonly used in bicycle riding, and in horseback riding, as well as those used in operating a rowing machine.

An object of the invention is to provide a machine of the above type, in which the user does not exert affirmative effort, but, on the contrary, muscular movement is mechanically imposed upon him regardless of whether he tries to relax or to resist such movement.

Another object is to provide a machine of the above type, capable of being operated from a fractional horsepower motor, which will yet afford exercise adequate for even powerful individuals.

Another object is to provide a device of the above type, by which the complex rhythmic relative movements of the legs, arms and body of the user are effected, with the use of conventional transmission gearing and linkage not subject to jamming or noisy operation.

Another object is to provide a machine of the above type which admits of ready adjustment with respect to the height, weight and age of the user.

Another object is to provide a machine of the above type, which in operation will not cause any injury to the floor, rug or other support on which it may stand when used in any ordinary room of a dwelling.

The invention involves a support frame or chassis carrying a pedal crank member, a seat and a handle bar, and an electric motor operating the pedal through a gear reduction, and preferably also connected by linkage to said seat and handle member for moving the same in a cycle by which is brought about the desired coordinated exercising movement of the user.

In a preferred embodiment the chassis carries a transmission box driven from the motor and driving the pedal crank shaft, preferably through a worm drive, and also driving the seat and handle supports, preferably by means of a connecting rod, protruding from the transmission box and operated from a crank or other eccentric member therein which is driven from the pedal crank shaft.

Preferably a generally horizontal control bar pivoted to the frame is operated from the connecting rod, the movement of said control bar being resisted by a coil spring connecting the free end of said bar to the frame and the tension of which is controlled by adjustably positioning the upper spring carriage thereof along said control bar. The seat and handle bar are mounted on corresponding support bars, one of which, preferably the seat carrying bar, is pivoted to the frame, the other, preferably the handle bar, pivoted at one end thereof, to the first of said bars, and between its ends to said control bar.

Figure 1:
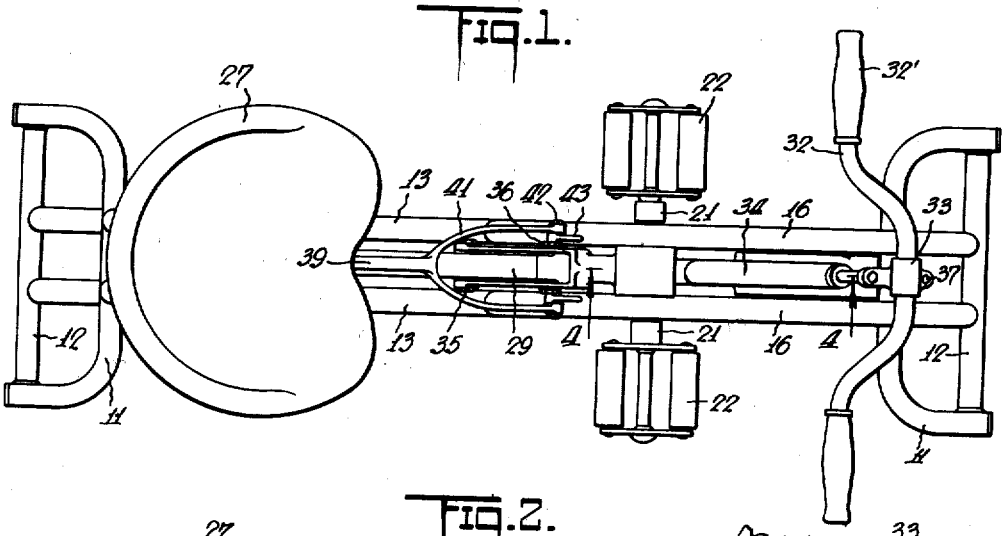
Figure 2:
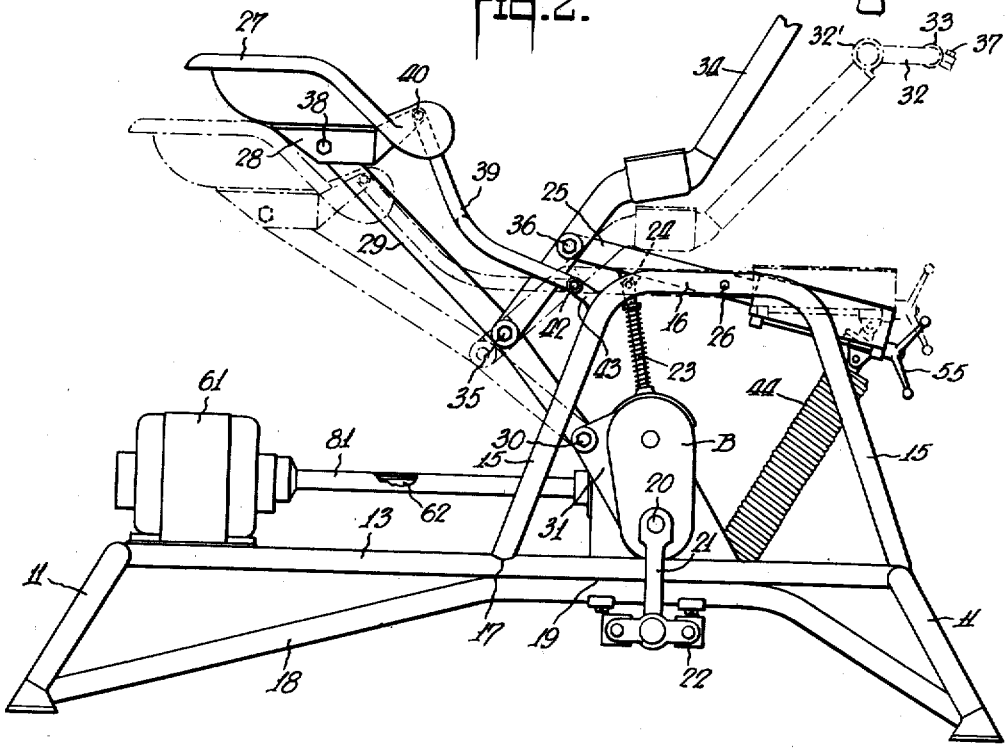
Figure 3:
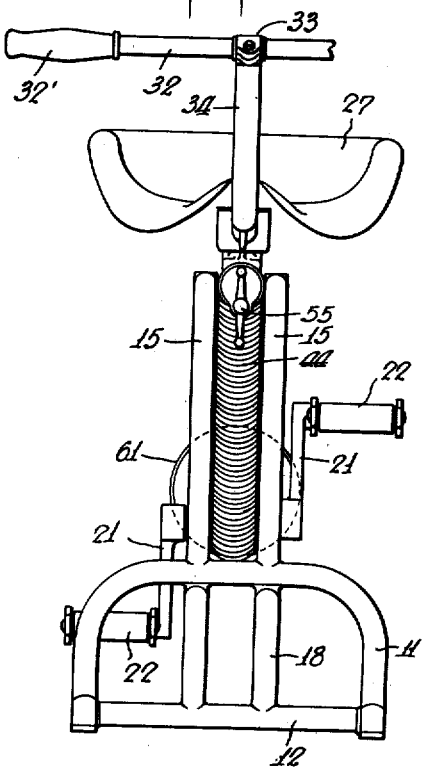
Figure 5:
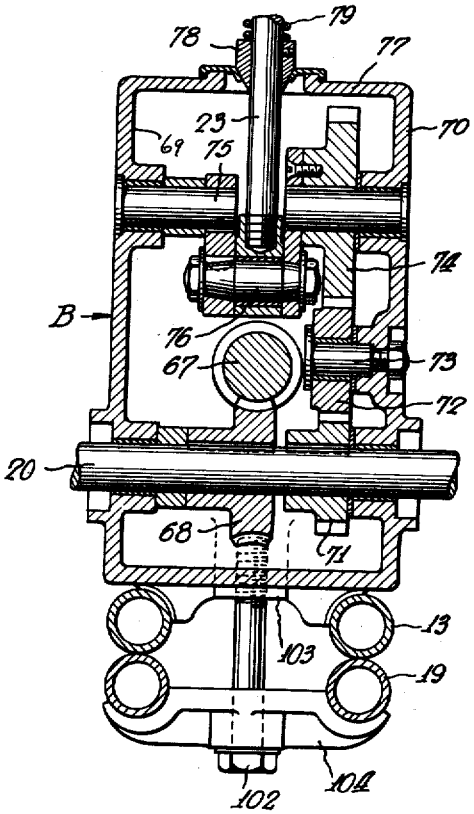
Figure 10:
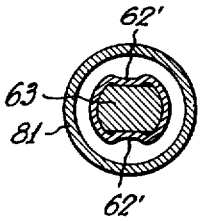
Figure 4:
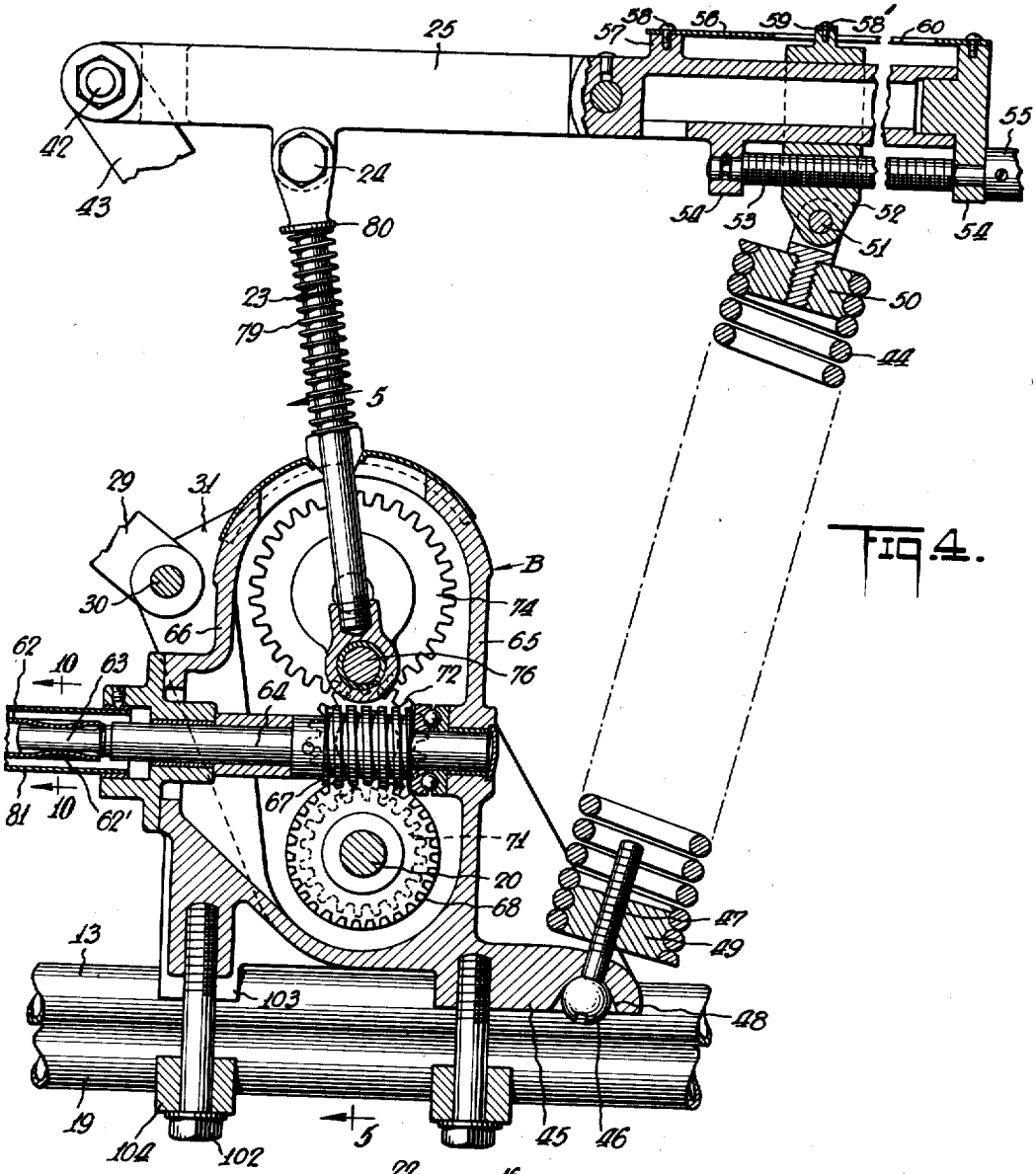
Figure 9:
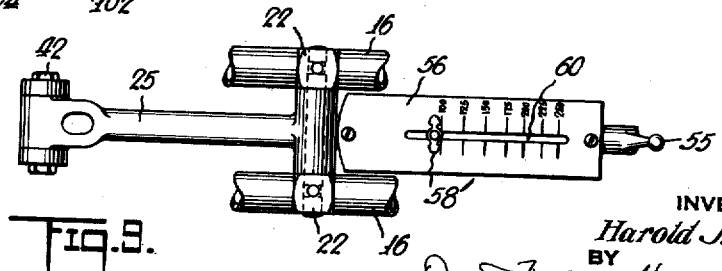

In the accompanying drawings, in which are shown one or more of various possible embodiments of the several features of the invention, Fig. 1 is a plan view of the machine, Fig. 2 is a side elevation thereof showing the operation thereof, Fig. 3 is a front elevation of the machine, Fig. 4 is a sectional view on an enlarged scale with parts broken away taken along the line 4—4 of Fig. 1, Fig. 5 is a view in transverse cross-section through the transmission box taken on line 5—5 of Fig. 4, Fig. 6 is a view similar to Fig. 4 with parts broken away showing an alternative embodiment of transmission box, Fig. 7 is a sectional view taken on line 7—7 of Fig. 6, Fig. 8 is a detail sectional view taken on line 8—8 of Fig. 6, Fig. 9 is a plan view showing the spring tension adjustment scale, and Fig. 10 is a detail sectional view taken on line 10—10 of Fig. 4.

Referring now to the drawings, the device comprises a chassis or frame, preferably made of metal tube stock, which may include a pair of transverse and inwardly inclined U-shaped foot members 11 the legs of each of which are connected at their ends by a transverse brace 12. The foot members are connected by a pair of longitudinal rods 13 forming the chassis. Each of rods 13 is reversely bent at its forward end to form a trapezoidal side frame 15 with a horizontal upper base 16 the downturned extremity of each rod being welded at 17 to the longitudinal portion 13 thereof. Longitudinal brace rods 18 are connected at their ends to the respective cross braces 12 and their intermediate portion extends horizontally at 19 under, along and in contact with the chassis rods 13 to which they may also be welded.

Upon the chassis and between the side frame pieces 15 is mounted the transmission box B, hereinafter to be described. It may be attached by screw 102 threaded into boss 103 and exerting pressure through clamp plate 104 against brace rods 19. Through the lateral walls of box B protrudes the pedal crank shaft 20 mounting the conventional bicycle pedal cranks 21 and pedals 22. Through the upper part of the transmission box protrudes a connecting rod 23 pivoted at its upper end 24 to an intermediate portion of the control bar 25 which in turn is pivotally mounted at 26 between the horizontal parts 16 of the side frame, and effects the relative movement of the seat and handle now to be described. To this end the seat and handle members are preferably mounted upon corresponding bars pivotally interconnected, the assemblage thereof being pivotally mounted upon the support frame. In the specific embodiment shown the seat 27 which may be a more or less conventional motorcycle seat, and is preferably of metal, is mounted by its central fin 28 to the upper end of a bar 29, the lower end of which is pivoted at 30 preferably to a fin 31 cast on the transmission box B.

The handle bar 32, which may be similar to that of a motorcycle, is centrally clamped in a corresponding collar 33 at the upper end of a supporting bar 34 therefor, the lower end of which bar is pivoted at 35 to the seat supporting bar 29 and which is pivoted between its ends as at 36 to the extremity of the control bar 25. Preferably, the collar 33 has the usual clamping screw 37 thereon for adjustably positioning the handle grips 32′ in accordance with the arm length of the user.

If the seat 27 were rigidly mounted upon its support bar 29 it would tilt with the movement of said bar in pivoting about pin 30. Means is therefore provided to maintain the seat at a comfortable and safe angle throughout the motion thereof from between its extreme forward and its extreme rearward position. A parallel motion linkage is, therefore, provided to assure substantially a translational movement of said seat parallel to itself. For this purpose, the mount of the seat 27 on the bar 29 is by means of a pivot screw 38 and a parallel motion link 39 is pivoted at its upper end to the front of the seat at 40, and its opposite end, (formed as a clevis 41 straddling the bar 34) is preferably pivotally mounted on pins 42 at corresponding ears 43 welded to the side frame 15. In the embodiment shown in Fig. 2 of the drawings, the lower ends of the bar 29 and link 39 are pivoted at fixed bearings 30 and 42 respectively, the line connecting which is at a considerable angle to that connecting the upper and movable ends of said bar and link shown respectively at 38 and 40. For true parallel motion said lines would have to be parallel. The seat in the embodiment shown does not move strictly parallel to itself, but in the rearmost position, it tilts downward slightly with respect to the position assumed at the forward part of its movement. The term "parallel motion linkage" as used in the claims, is intended to embrace within its scope the showing in the drawings in which the seat is controlled by link 39 to pivot about its pivotal mount 38 to be maintained in substantially but not necessarily in strictly parallel relation.

To resist the pivotal motion imparted by the connecting rod 23 to the control bar 25 a heavy coil spring 44 is provided, pivotally anchored to the frame at one end and to the control bar at the other. The frame mount may comprise a screw 47 with a spherical head 46 housed in a corresponding socket 48 in a foot 45 cast with the box B. The shank of screw 47 is screwed through the button 49 which is gripped by the lower turns of the spring 44. The upper end of the spring has a corresponding button 50 pivoted at 51 to a carriage 52 formed as a sleeve which encircles the control bar 25. A screw 53 threaded through said carriage 52 is rotatably mounted at its ends in corresponding ears 54 on the control bar. By means of a handle 55 at the forward end, the screw 53 is turned and the carriage 52 thereby caused to be moved forward or backward to the desired position, for adjusting the tension of the spring 44. Preferably, as best shown in Fig. 9, a slotted scale plate 56 is attached at 58 upon corresponding studs 57 on top of the control bar 25. A corresponding pointer 58′ affixed on a stud 59 on top of the carriage 52 travels in longitudinal slot 60 in the plate, to indicate the setting, preferably in terms of the weight of the user.

While, of course, it would be possible, to arrange the parts substantially as in my copending application, Serial No. 733,546 of July 3, 1934, issued February 8, 1938, as Patent No. 2,107,447, to operate the pedals by foot power, which in turn causes the movement of the seat and handle bars, it is preferred, according to the present invention, to operate the apparatus by a mechanical power drive. For this purpose, a fractional horse power electrical motor 61 is mounted, preferably at the rear end of the chassis and is connected by means of a drive shaft 62 to the transmission box.

While drive may be effected through any desired clutch, the drive shaft 62 is illustratively shown as a hollow shaft operating within a fixed tube 81, and having a squared extremity 62′ telescoped over the correspondingly flattened protruding extremity 63 of cross shaft 64 bearing in the front and back walls 65 and 66 of the transmission box B. A worm 67 upon said shaft 64 meshes with a worm wheel 68 keyed to the pedal crankshaft 20, which bears in the lateral walls 69 and 70 of the transmission box B.

The pedal crankshaft 20 also serves to deliver power to the connecting rod 23, by which the seat and handle mounting bars are operated. Desirably the cycle of movement of the handle bar or seat is at a frequency having a definite relation to the frequency, that is, the revolutions per minute of the pedal crank. To this end, power is transmitted from the worm wheel shaft to perform the complete cycle of pedal operation, at faster rate but at a definite ratio to the cycle of motion of the handle supporting bar, or of the seat supporting bar. In the specific embodiment shown, the pedal bars are mounted directly upon the worm wheel shaft, while a gear reduction is interposed between said worm wheel shaft and the drive for the seat or handle bar.

For this purpose a gear 71 keyed to shaft 20 meshes with an idle gear 72 on stub shaft 73 in the transmission box, which, in turn, meshes with drive gear 74 on transmission crankshaft 75 near the upper part of the box. The crank 76 of shaft 75 affords the bearing for the lower end of the connecting rod 23. That rod preferably protrudes from the upper wall 77 of the box through a stuffing box 78 resiliently tightened by a coil spring 79 about the protruding end of the connecting rod 23 and reacting at its upper end, against flange 80.

The use of the apparatus will be obvious from the above description. It may be briefly noted that after the user mounts the apparatus, as he would a motorcycle, and places his feet on the pedals, he sets the electric motor 61 into action by throwing the switch (not shown) which may be disposed at any convenient accessible place. The worm gear reduction 67—68 is such as to cause driving of the pedal crankshaft 20 at the rate of about 80 revolutions per minute. At the same time transmission crank 76 will move at desired speed, determined by the ratio of gears 71 and 74, preferably at approximately thirty revolutions per minute. In this operation, the connecting rod 23, through the control bar 25 will exert alternate push and pull upon bar 34 at pivot 36. As the rear of control bar 25 moves downward about pivot 26, the forward end moves correspondingly upward and stresses the spring 44. In the downward pivoting of the rear of the control bar, the handle support bar 34 is lowered therewith, said bar 34 correspondingly depressing the seat support bar 29 about its pivot 30, by virtue of the thrust delivered through pivot 35. The portion of the control bar 25 between the pivots 26 and 36, forms with the portion of the handle support bar 34 between the pivots 35 and 36 a toggle, so that said pivots 35 and 36 moving through distinct paths cause said bar 34 to tilt forward about pivot 35 and about the control bar pivot 36. Of course what is designated as the toggle, does not become completely set, for, even in the extreme position, the link 25 and the lower part of bar 34 form a large obtuse angle relative to each other, but never reach straight angle or toggle locking position. The extreme position of the downward and rearward movement of seat 27 and the concurrent downward and forward movement of handle bar 32 (shown in Fig. 2 in dotted lines) is reached when the transmission crank 76 has reached lower dead center. As the crank 76 passes dead center position, the stressed spring 44 aids the motor in the return movement, in which the seat 27 and the handle bar 32 perform the reverse of the motion previously set forth, and reach their position of closest approach when crank 76 reaches upper dead center.

Thus in operation, the user, without exerting any affirmative effort, is constrained to perform repeated cycles of vigorous muscular movements. His legs are caused to perform a pedaling motion. At the same time his trunk and arms are caused alternately to be bent over and stretched by the rearward movement of the seat and the concurrent forward movement of the handle bars and then to be straightened and relaxed by the return movement of the seat and handle bar.

As appears from the drawings, the simultaneous backward movement of the seat and forward movement of the handle bar with respect to the fixed position of the pedal crank shaft 20 helps to maintain the body of the user in balanced position.

In the pivoting movement of seat mounting bar 29, the seat 27 moves through a substantially translational path, at no time tilting excessively from horizontal, since the parallel motion link 39 compensates for the excessive tilting otherwise incurred, as above set forth.

The alternative embodiment of Figs. 6 to 8 is generally similar to that described, except that it includes selective gear reduction for greater flexibility of operation, in accordance with the physical condition of the user. Corresponding parts bear the same reference numerals, primed. In general, the transmission box B' resembles that of the other embodiments, but it differs in that the worm 67' is on a countershaft 90 parallel to the motor driven shaft 64' and propelled at either of two alternative power speed reductions depending on the setting of a gear shift. For this purpose, a pair of alternative driving gears 91 and 92 are keyed on shaft 64' and a pair of alternative driven gears 93 and 94 are loosely mounted on countershaft 90. The gear transmission 92, 94, affords a greater reduction than the gear transmission 91, 93, because the drive gear 92 of the former is smaller and the driven gear 94 is larger than the corresponding elements of the alternative drive. Driven gears 93 and 94 have clutch teeth 95, alternatively engaged by corespondingly conformed teeth on clutch sleeve 96 keyed to countershaft 90 between gears 93 and 94, and positioned by means of a yoke 97 straddling the same, the shank 98 of which yoke is mounted on the end of an arm 99 which may be turned by means of an exposed handle 100. A coil spring 101 resiliently retains the clutch 96 in one of the other of the two positions as desired. The transmission box of Figs. 6 to 8 is interchangeable with that of Figs. 3 and 4, and admits of either a fast operation of the pedal say at 80 R. P. M. or a lower operation say at 40 R. P. M., in each of which the motor 61 operates on full voltage.

It will thus be seen that there is herein described apparatus in which the several features of this invention are embodied, and which apparatus in its action attains the various objects of the invention and is well suited to meet the requirements of practical use.

As many changes could be made in the above construction, and many apparently widely different embodiments of this invention could be made without departing from the scope thereof, it is intended that all matter contained in the above description or shown in the accompanying drawings shall be interpreted as illustrative and not in a limiting sense.

Having thus described my invention, what I claim as new and desire to secure by Letters Patent is:

1. An exercising machine, comprising a support base, a handle member, a seat member, and pedal cranks on said suport, an electric motor having a speed reducing connection for propelling said cranks and a speed reducing driving linkage between said motor, said handle member and said seat member, to move the latter two members alternately toward and away from each other.

2. An exercising machine comprising a support base, pedal cranks thereon, a seat member having a support bar, a handle member having a support bar, said support bars being pivotally interconnected, the assemblage thereof being pivotally mounted upon said support frame, an electric motor, a speed reducing transmission between said motor and said pedal cranks and a speed reducing driving linkage between said motor and one of said supporting bars to cause said bars to move the seat and handle member alternately toward and away from each other.

3. An exercising machine comprising a support base, a motor, a worm driven by said motor, a worm wheel meshing therewith and having a shaft, pedal cranks on said support base driven from said shaft, a seat member having a support bar, a handle member having a support bar, said support bars being pivotally interconnected, the assemblage thereof being pivotally mounted upon said support frame, said bars being interrelated for movement of the seat and handle member in opposed directions upon impulse exerted upon one of said bars and means driven from said worm wheel shaft for exerting alternate push and pull upon one of said bars.

4. The combination recited in claim 3 in which the transmission between the worm wheel shaft and the bar operating means causes the latter to operate at a lesser frequency than the frequency or revolutions per minute of the pedals.

5. An exercising machine, comprising a support base, a seal member, a long bar affixed thereunder at one end thereof and pivoted at its opposite end to said frame, a second bar pivoted to said first bar and extending generally upward therefrom and having a handle member affixed to the upper end thereof, a generally horizontal control bar pivoted between its ends to satd frame, and pivoted near its forward end to said handle carrying bar, pedal cranks positioned laterally of said frame, and a transmission between said cranks and said control bar, serving in operation alternately to cause said seat and said handle members to move toward and away from each other.

6. An exercising machine comprising a support base, a seat member having the upper end of a support bar attached thereunder, the opposite end of said bar having a fixed pivotal support with respect to said base, a second support bar pivoted to said seat support bar near one end thereof and carrying a handle bar at the upper end thereof, a control bar pivotally mounted on said base and secured near its rear end to one of said support bars, a pedal crank and a transmission between the latter and said control bar.

7. An exercising machine comprising a support base, having upstanding parallel frame pieces, a generally horizontal control bar pivoted between said frame pieces, a pedal movement having a transmission to said control bar, a seat, a support bar secured thereunder at one end thereof and pivoted to said frame at the opposite end thereof, a handle bar, and a support bar for the latter pivoted at one end to said seat support bar and pivoted between its ends to said control bar.

8. An exercising machine comprising a support base having upstanding parallel frame pieces, a generally horizontal control bar pivoted between said frame pieces, a pedal movement having a transmission to said control bar, a seat, a support bar secured thereunder at one end and pivoted to said frame at the opposite end, a handle bar, a support bar for the latter pivoted at one end to said seat support bar and pivoted between its ends to said control bar, said seat having a pivotal mount on the seat support bar, and a parallel motion link pivoted at one end to the forward part of said seat and at the opposite end to said frame, the length of said link being approximately the same as the distance between the pivoted end of the handle support bar and the pivot mount of the seat.

9. An exercising machine including a pair of parallel lateral frame members, a control bar pivoted between said members, a pedal crank member having a transmission connected to said control bar, for movement of the latter about its pivot, a seat member and a handle bar member, support bars respectively mounting the same, one of said bars having a fixed pivotal support on said frame and the other being pivoted to said control bar, the lower end of one of said support bars being pivoted to an intermediate portion of the other of said support bars.

10. An exercising machine including a pair of parallel lateral frame members, a control bar pivoted between said members, a pedal crank member having a transmission connected to said control bar for movement of the latter about its pivot, a seat member and a handle bar member, support bars respectively mounting the same, one of said bars being pivoted to said frame and the other pivoted to said control bar, the lower end of one of said bars pivoted to an intermediate portion of the other of said bars, said seat having a pivotal mount on the support bar thereof, and a parallel motion link for said seat, pivoted at one end to the front of said seat and at the other end to said frame.

11. An exercising machine including a pair of parallel lateral frame members, a control bar pivoted between said members, a pedal crank member having a transmission connected to said control bar for movement of the latter about its pivot, a seat member and a handle bar member, support bars respectively mounting the same; one of said bars being pivoted to said frame and the other pivoted to said control bar, the lower end of one of said bars pivoted to an intermediate portion of the other of said bars, said seat having a pivotal mount on the support bar thereof and a parallel motion link pivoted at its rear end to the front of said seat and having a clevis at the other end straddling the handle support bar and pivoted at its extremities to said frame.

12. An exercising machine comprising a support frame, including a pair of parallel lateral members, a generally horizontal control bar pivotally mounted between said lateral members, an adjustable resistance coil spring attached at its lower end to said frame, and attached at its upper end to the forward part of said control bar, means for adjusting the position of the upper end of said spring lengthwise of said control bar to determine the tension thereof, a pedal crank member, linkage connecting the same to said control bar to effect a pivoting movement of the latter, a seat member and a handle bar member and linkage connecting said control bar to said respective members to effect relative movement thereof during the stressing of said resistance spring and reverse relative movement thereof during the return of said spring.

13. An exercising machine comprising a support base, a seat, a handle member, a bar pivoted to the frame and mounting one of said members at its upper end, a bar pivoted at one end to said first bar, and mounting the other of said members at its upper end, a control bar pivoted to said frame and having a pivotal connection at one end to said second bar, a coil resistance spring mounted at its lower end to said frame, and having a carriage affixed at its upper end to the forward end of said control bar, and a screw and nut connection for shifting said spring carriage longitudinally of said control bar to adjusted position thereof, said carriage having an indicator and a scale on the control bar for registering the setting in accordance with the weight of the user.

14. An exercising machine including a support frame, a pedal crank member, a seat, a support bar for said seat pivoted at its upper end with respect to the base of said seat, and pivoted at its lower end to said frame, a linkage for moving said support bar about the pivot of the latter in the movement of the pedal crank member, and means for maintaining the seat in horizontal position throughout by movement about the pivot support, said means comprising a parallel motion linkage.

15. An exercising machine, comprising a support base, a movable seat and a movable handle bar supported on said base, a transmission box on said base, a pedal crank member carried thereby, an electric motor on said base, a speed reducing transmission in said box for delivering torque from said motor to said pedal crank, said box having a further speed reduction transmission to said seat and said handle bar to cause the latter alternately to move toward and away from each other.

16. An exercising machine, comprising a support base, a movable seat, and a movable handle bar supported on said base, a transmission box on said base, a pedal crank member carried thereby, an electric motor on said base, a speed reducing transmission in said box for delivering torque from said motor to said pedal crank, said box having a further speed reduction transmission to said seat and said handle bar to cause the latter to move relative to each other, said linkage including a pivoted control bar operated from said transmission box and governing the movement of both said seat and said handle bar, and an adjustable resistance spring connecting an end of said control bar to said support base.

17. An exercising machine comprising a support frame, pedal cranks thereon, an electric motor on said frame, a speed reduction including a worm and a worm wheel meshing therewith for transmitting torque from said motor to said pedal cranks, a seat, a support therefor, a handle member, a support bar therefor pivotally mounted to said frame and speed reducing means between said worm wheel and said handle support bar to pivot the latter alternately toward and away from said seat.

18. An exercising machine comprising a support frame, an electric motor thereon, a gear transmission box driven therefrom including a worm, a worm wheel meshing therewith, and having a shaft, pedal cranks mounted on the extremities of said shaft, said transmission box having a spur gear reduction therein, a seat, a support therefor, a handle member, a support bar therefor pivotally mounted to said frame, a crank driven from said spur gear transmission and means including a connecting rod between said crank and said handle support bar for causing the latter alternately to approach and recede from the seat.

19. An exercising machine comprising a support frame, a seat, a handle member, pedal crank members, an electric motor and a transmission box carried on said frame, said transmission box having a worm drive connection between said motor and said pedal crank members for power drive of the latter, a bar pivotally mounted near its lower end with respect to said frame, said seat being carried upon the upper end of said bar, and means transmitting power from said transmission box to cause the pivoted seat carrying bar alternately to approach and recede with respect to the handle member during operation.

20. An exercising machine comprising a support frame, a seat, a handle bar, pedal crank members, an electric motor and a transmission box carried on said frame, said transmission box having a worm drive connection between said motor and said pedal crank members for power drive of the latter, pivotally interconnected support bars mounting the seat and the handle bar upon the respective upper ends thereof, the assemblage of said support bars being pivotally mounted upon said support frame and means transmitting power from said transmission box to operate both of said support bars in alternate relative movements of approach and recession.

21. An exercising machine comprising a support base, having a pair of similar lateral frame members, a transmission box mounted on said base, a shaft transversely therethrough having crank pedals on the ends thereof, a generally horizontal control bar pivoted between said frame members, a crank rod extending upward from said transmission box and pivoted to said control bar, an adjustable coil spring mounted at its lower end on said frame and a carriage for the upper end, thereof slidably adjustable on said control bar for setting the spring tension, a seat member and a handle bar member, bars supporting the respective members, one of said bars being pivoted at one end to the frame, the other of said bars pivoted at one end to said first bar and pivoted between its ends to said control bar.

22. An exercising machine comprising a support base having a pair of similar lateral members, a transmission box mounted on said base, a shaft transversely therethrough having pedal cranks on the ends thereof, a generally horizontal control bar pivoted between said lateral members, a connecting rod extending upward from said transmission box and pivoted to said control bar, an adjustable coil spring affixed at one end to said frame and having a carriage at the opposite end slidably adjustable on said control bar for setting the spring tension, a seat member and a handle bar member, bars pivotally supporting the respective members, one of said bars being pivoted at one end to the frame, the other of said bars pivoted at one end to said first bar, and pivoted between its ends to said control bar, and an electric motor mounted on said support base, having a worm drive connection within said transmission box to said pedal shaft and having a reduction gear transmission within said transmission box to said connecting rod.

23. In an exercising machine, the combination of a transmission box, having a drive shaft longitudinally therethrough, and a pedal crank shaft transversely therethrough, a worm drive connection between said drive shaft and said pedal crankshaft, a transmission for operating a seat and an operating handle including a transmission crankshaft within said box having a connecting rod thereon, protruding from the box, and a reduction gearing transmission within said box from said pedal crankshaft to said transmission crankshaft.

24. An exercising machine comprising a frame of tube stock, including transverse floor rests, longitudinal side rests, tube stock lateral members rising from said base members, and forming a platform, an electric motor mounted thereon, a transmission box mounted thereon between said lateral members, a drive shaft from said motor to said transmission box, said lateral tube stock members extending horizontally at the upper ends thereof, a control bar pivoted between said horizontal members, a connecting rod extending upward from said transmission box and pivoted to said control bar, a seat member, a handle bar member, support bars for said members, one of said support bars pivoted at one end to the other support bar and intermediate its ends to said control bar and a resistance spring connected at one end to said frame and at the other to the extremity of said control bar.

25. An exercising machine comprising a frame of tube stock, including transverse floor rests, longitudinal side rests, tube stock lateral members rising from said base members, and forming a platform, an electric motor mounted thereon, a transmission box mounted thereon between said lateral members, a drive shaft from said motor to said transmission box, said lateral tube stock members extending horizontally at the upper ends thereof, a control bar pivoted between said horizontal members, a connecting rod extending upward from said transmission box and pivoted to said control bar, a seat member, a support bar therefor pivoted at its lower end to said transmission box, a handle bar member, a support bar therefor pivoted at its lower end to said seat support bar, and pivoted between its ends to said control bar, and a resistance coil spring having a carriage pivoted at its lower end to said frame and a carriage adjustably slidable at its upper end along said control bar.

26. An exercising machine comprising a frame of tube stock, including transverse floor rests, longitudinal chassis frame bars and tube stock lateral members rising from said chassis bars and forming a platform, an electric motor mounted on said chassis bars, a transmission box mounted on said chassis bars between said lateral members, a drive shaft from said motor to said transmission box, said lateral members extending horizontally at the upper ends thereof, a control bar pivoted between said horizontal members, a connecting rod extending upward from said transmission box and pivoted to said control bar, a seat member, a support bar therefor pivoted at its lower end to said transmission box, a handle bar, a support bar therefor pivoted at its lower end to said seat support bar, and pivoted between its ends to said control bar, and a reaction coil spring having a carriage pivoted at its lower end to said frame and a carriage adjustably slidable at its upper end along said control bar, said seat being pivoted near its back to the upper end of said seat carrying bar, and a parallel motion link pivoted at one end to said frame and at the other to the forward part of said seat.

27. An exercising machine comprising a frame structure, a seat, a support bar therefor pivotally mounted at its lower end upon said frame, a handle member, a support bar therefor and means interlinking said support bars with respect to each other and with respect to said frame structure for moving said seat along a curved path in a generally horizontal direction while maintaining said seat in substantially horizontal position throughout and for simultaneously effecting a movement of said handle member in a generally horizontal direction opposed to that of said seat.

28. An exercising machine including a frame structure, a seat, a support bar therefor pivoted to said structure at the lower end thereof, a handle member, a support bar therefor interlinked with said seat bar to cause said members to move in curved paths in generally horizontal direction and in opposition to each other, and parallel motion linkage for maintaining said seat at substantially constant inclination with respect to the horizontal during its movement.

29. An exercising machine including a frame structure, a bar having a fixed pivotal support with respect to said structure, a second bar pivotally connected to said first bar, a control member having a fixed pivotal support with respect to said structure and pivotally connected to said latter bar, whereby the movement of said bars is constrained in generally opposed directions, a seat fixed to one of said bars against sliding movement, and a handle supported on the other bar.

30. An exercising machine including a frame structure, a bar having a fixed pivotal support with respect to said structure, a second bar pivotally connected to said first bar, a control member having a fixed pivotal support with respect to said latter bar whereby the movement of said bars is constrained in generally opposed directions, a seat fixed to one of said bars against sliding movement, a handle supported on the other bar, and means for resisting the movement of said bars during a portion of their operating cycle.

31. An exercising machine including a frame structure, a bar having a fixed pivotal support with respect to said structure, a second bar pivotally connected to said first bar, a control member having a fixed pivotal support with respect to said latter bar whereby the movement of said bars is constrained in generally opposed direction, a seat fixed to one of said bars against sliding movement, a handle supported on the other bar, and spring means for resisting the movement of said bars during a portion of their operating cycle, and reacting to aid return of said bars during the remainder of said cycle.

32. An exercising machine including a frame structure, a first bar having a fixed pivotal support with respect to said structure, a second bar pivotally connected to said first bar, a control member having a fixed pivotal support with respect to said frame structure, pivotally connected to said latter bar and forming with part of said latter bar a toggle for constraining the movement of said bars in opposed direction, a seat supported on one of said bars against sliding movement, and a handle support on the other bar.

33. An exercising machine including a frame structure, a seat supporting bar, a handle supporting bar, one of said bars having a fixed pivotal support with respect to said frame structure and pivotally connected to the other supporting bar, a control bar having intermediate the ends thereof a fixed pivotal support with respect to said frame structure, pivotally connected at one end to said latter supporting bar and forming with part of said latter supporting bar a toggle for constraining the movement of said supporting bars in opposed directions, and a spring fixed at one end to said frame structure and pivotally connected at its other end to the other end of said control bar for resisting the movement of said supporting bars during a portion of their operating cycle and reacting to aid the return of said bars during the remainder of said cycle.

34. An exercising machine including a frame structure, a seat supporting bar, a handle supporting bar, one of said bars having a fixed pivotal support with respect to said frame structure and pivotally connected to the other supporting bar, a control member having a fixed pivotal support with respect to said frame structure, pivotally connected to said latter supporting bar above the pivotal connection between said supporting bars and forming with part of said latter supporting bar between its pivotal connections a toggle for constraining the movement of said supporting bars in opposed directions.

HAROLD J. MARLOWE.